United States Patent
Kalenahalli et al.

(10) Patent No.: US 12,069,000 B2
(45) Date of Patent: Aug. 20, 2024

(54) SYSTEMS AND METHODS FOR AUTOMATIC FREQUENCY COORDINATION

(71) Applicant: Outdoor Wireless Networks LLC, Claremont, NC (US)

(72) Inventors: Suryanarayana A. Kalenahalli, Chantilly, VA (US); Ariful Hannan, Sterling, VA (US)

(73) Assignee: Outdoor Wireless Networks LLC, Claremont, NC (US)

( * ) Notice: Subject to any disclaimer, the term of this patent is extended or adjusted under 35 U.S.C. 154(b) by 318 days.

(21) Appl. No.: 17/570,020

(22) Filed: Jan. 6, 2022

(65) Prior Publication Data
US 2022/0224496 A1    Jul. 14, 2022

Related U.S. Application Data

(60) Provisional application No. 63/135,330, filed on Jan. 8, 2021.

(51) Int. Cl.
*H04L 5/00* (2006.01)
*H04W 16/10* (2009.01)
(Continued)

(52) U.S. Cl.
CPC .......... *H04L 5/0069* (2013.01); *H04L 5/0073* (2013.01); *H04W 16/10* (2013.01); *H04W 16/16* (2013.01); *H04W 72/0453* (2013.01)

(58) Field of Classification Search
CPC .... H04L 5/0069; H04L 5/0073; H04W 16/10; H04W 16/16; H04W 72/0453;
(Continued)

(56) References Cited

U.S. PATENT DOCUMENTS

2015/0036509 A1\* 2/2015 Lopes ................... H04L 5/0062
370/252
2017/0318470 A1\* 11/2017 Srikanteswara .... H04W 52/367
(Continued)

OTHER PUBLICATIONS

Federal Communications Commission, "Unlicensed Use of the 6 GHz Band", 47 CFR Parts 0 and 15, [ET Docket No. 18-295 and GN Docket No. 17-183; FCC 20-51; FRS 16729], Federal Register, vol. 85, No. 101, May 26, 2020, Rules and Regulations, pp. 31390 through 31414, Published: US.
(Continued)

*Primary Examiner* — Yu-Wen Chang
(74) *Attorney, Agent, or Firm* — Fogg & Powers LLC

(57) ABSTRACT

Systems and methods for automatic frequency coordination are provided. In one embodiment, an automatic frequency coordination (AFC) system for authorizing unlicensed operator utilization of a shared spectrum band comprising channels licensed to incumbent operators comprises: a processor coupled to a memory; and an exclusion zone calculator executed by the processor, the exclusion zone calculator configured to construct an exclusion zone for an incumbent receiver antenna operating on a licensed channel of the shared band, wherein the calculator is configured to construct the exclusion zone by: calculating a set of exclusion zone radiuses along a plurality of radials of a radial grid based on applying a moving average filter to interference power values calculated for a plurality of locations along a length of each of the radials; and applying an averaging filter to the exclusion zone radiuses to define the exclusion zone between the exclusion zone radiuses and the receiver antenna.

22 Claims, 12 Drawing Sheets

(51) Int. Cl.
   *H04W 16/16*   (2009.01)
   *H04W 72/0453*   (2023.01)

(58) Field of Classification Search
   CPC ..... H04W 16/14; H04B 1/123; H04B 17/345; H04B 17/382; H04B 17/3912
   See application file for complete search history.

(56) References Cited

U.S. PATENT DOCUMENTS

| | | | | |
|---|---|---|---|---|
| 2020/0359229 | A1* | 11/2020 | Macmullan | H04W 24/02 |
| 2021/0389474 | A1* | 12/2021 | Hamzeh | H04W 16/14 |
| 2022/0141681 | A1* | 5/2022 | Flesch | H04B 17/382 |
| | | | | 370/252 |
| 2022/0167176 | A1* | 5/2022 | Khalid | H04W 72/0453 |
| 2022/0256547 | A1* | 8/2022 | Macmullan | H04W 72/0453 |
| 2023/0300757 | A1* | 9/2023 | Furuichi | H04W 52/243 |
| | | | | 455/522 |

OTHER PUBLICATIONS

Wireless Innovation Forum, "Requirements for Commercial Operation in the U.S. 3550-3700 MHz Citizens Broadband Radio Service Band", Document WINNF-TS-0112, Version V1.9.1, Mar. 11, 2020, Page(s) Cover page through76, (c) 2020 The Software Defined Radio Forum Inc.

Comsearch, "In the matter of Unlicensed Use of the 6 GHz Band; Expanding Flexible Use in Mid-Band Spectrum Between 3.7 and 24 GHz", Federal Communications Commission, ET Docket No. 18-295, GN Docket No. 17-183, Feb. 15, 2019, pp. 1 through 51.

Godfrey, Tim, "Perspectives on Spectrum and Resilient Communication for the Grid", ISART: 5G Spectrum and a Zero-Trust Network, EPRI, Aug. 13, 2020 [Retrieved on Mar. 22, 2022], Retrieved from the Internet: URL: https://www.its.bldrdoc.gov/media/66744/godfrey_isart2020.pdf, Slides 1-18.

International Searching Authority, "International Search Report and Written Opinion from PCT Application No. PCT/US2022/011435, Apr. 21, 2022", from Foreign Counterpart to U.S. Appl. No. 17/570,020, pp. 1 through 8, Published in: KR.

Kang, "Requirements for 6 GHz Unlicensed Bands", Journal of Advanced Navigation Technology, 24(5), Oct. 30, 2020, pp. 415 through 422.

Naik et al., "Next Generation Wi-Fi and 5G NR-U in the 6 GHz Bands: Opportunities & Challenges", arXiv:2006.16534v2 [cs.NI], Jul. 30, 2020, pp. 1 through 29.

Wireless Innovation Forum (WINNF), "Requirements for Protection of Incumbents in the 6 GHZ Band" Working Document WINNF-TR-1003, Version V0.0.0 (IR1)-r5.1, Apr. 8, 2020, Page(s)—Cover Page through 14.

* cited by examiner

| Index of channels | Associated Channels (MHz) |
|---|---|
| 1 | 5945-6025 |
| 2 | 6025-6105 |
| 3 | 6105-6185 |
| 4 | 6185-6265 |
| 5 | 6265-6345 |
| 6 | 6345-6425 |
| 7 | 6425-6505 |
| 8 | 6505-6585 |
| 9 | 6585-6665 |
| 10 | 6665-6745 |
| 11 | 6745-6825 |
| 12 | 6825-6905 |
| 13 | 6905-6985 |
| 14 | 6985-7065 |

Fig. 9B

SYSTEMS AND METHODS FOR AUTOMATIC FREQUENCY COORDINATION

CROSS-REFERENCE TO RELATED APPLICATION

This patent application claims priority to, and the benefit of, U.S. Provisional Patent Application No. 63/135,330, titled "SYSTEMS AND METHODS FOR AUTOMATIC FREQUENCY COORDINATION" filed on Jan. 8, 2021, which is incorporated by reference in its entirety.

BACKGROUND

Increases in demand for wireless connectivity between devices has led to the development of various spectrum sharing schemes where unlicensed users have the opportunity to utilize channels previously reserved for use exclusively by licensed users. As an example, the United States Federal Communications Commission (FCC) is opening the 6 GHz band historically reserved as a licensed microwave communications fixed service (FS) band, for use by unlicensed devices such as used by radio local area networks (RLANs). However, as a condition of this use, unlicensed devices receive permission to operate through an automatic frequency coordination (AFC) system to protect incumbent fixed microwave operations from harmful interference generated by unlicensed devices. AFC allows for efficient utilization of a shared spectrum band between incumbent services that operate on licensed channels of the shared spectrum band and the unlicensed operations that are craving for increased bandwidth. One method that has been suggested to regulate the unlicensed operations is for an AFC system to generate geographic exclusion zones where incumbent services can operated on their licensed channels free from potential interference from unlicensed devices. An exclusion zone may be defined as a closed polygon extending from the incumbent's facility, inside of which protection to the incumbent is guaranteed by not allowing any interference from unlicensed operations. The proper construction of these exclusion zones therefore benefits both the incumbent services and the unlicensed operations by facilitating spectrum sharing without the threat of interference to incumbent operations. However, existing methods for constructing exclusion zones is time and calculation extensive, and due to factors such as non-uniform terrains around fixed microwave operations, often result in non-contiguous polygons due to the nature of propagation model involved in the interference calculation.

SUMMARY

The embodiments of the present disclosure provide methods and systems for automatic frequency coordination and will be understood by reading and studying the following specification.

Systems and methods for automatic frequency coordination are provided. In one embodiment, an automatic frequency coordination (AFC) system for authorizing unlicensed operator utilization of a shared spectrum band comprising channels licensed to incumbent operators is provided. The AFC system comprises: a processor coupled to a memory; and an exclusion zone calculator executed by the processor, the exclusion zone calculator configured to construct an exclusion zone for an incumbent receiver antenna operating on a licensed channel of the shared spectrum band, wherein the exclusion zone calculator is configured to construct the exclusion zone by: calculating a set of exclusion zone radiuses along a plurality of radials of a radial grid based on applying a moving average filter to interference power values calculated for a plurality of locations along a length of each of the plurality of radials; and applying an averaging filter to the set of exclusion zone radiuses to define the exclusion zone between the exclusion zone radiuses and the incumbent receiver antenna.

DRAWINGS

Embodiments of the present disclosure can be more easily understood and further advantages and uses thereof more readily apparent, when considered in view of the description of the preferred embodiments and the following figures in which:

FIG. 9B is a chart illustrating an example channelization of the 6-GHz shared spectrum band for 80 MHz channels.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide techniques for efficient construction and utilization of contiguous exclusion zones for fixed incumbent operators. Embodiments disclosed herein also disclose methods to build a channel map that covers a geographic area utilizing these exclusion zones. Leveraging the exclusion zones and channel maps, further embodiments are disclosed of different evaluation methods an AFC system may implement to managing the authorization of non-licensed operators to prevent interference with the fixed incumbent operators.

Figure 1:
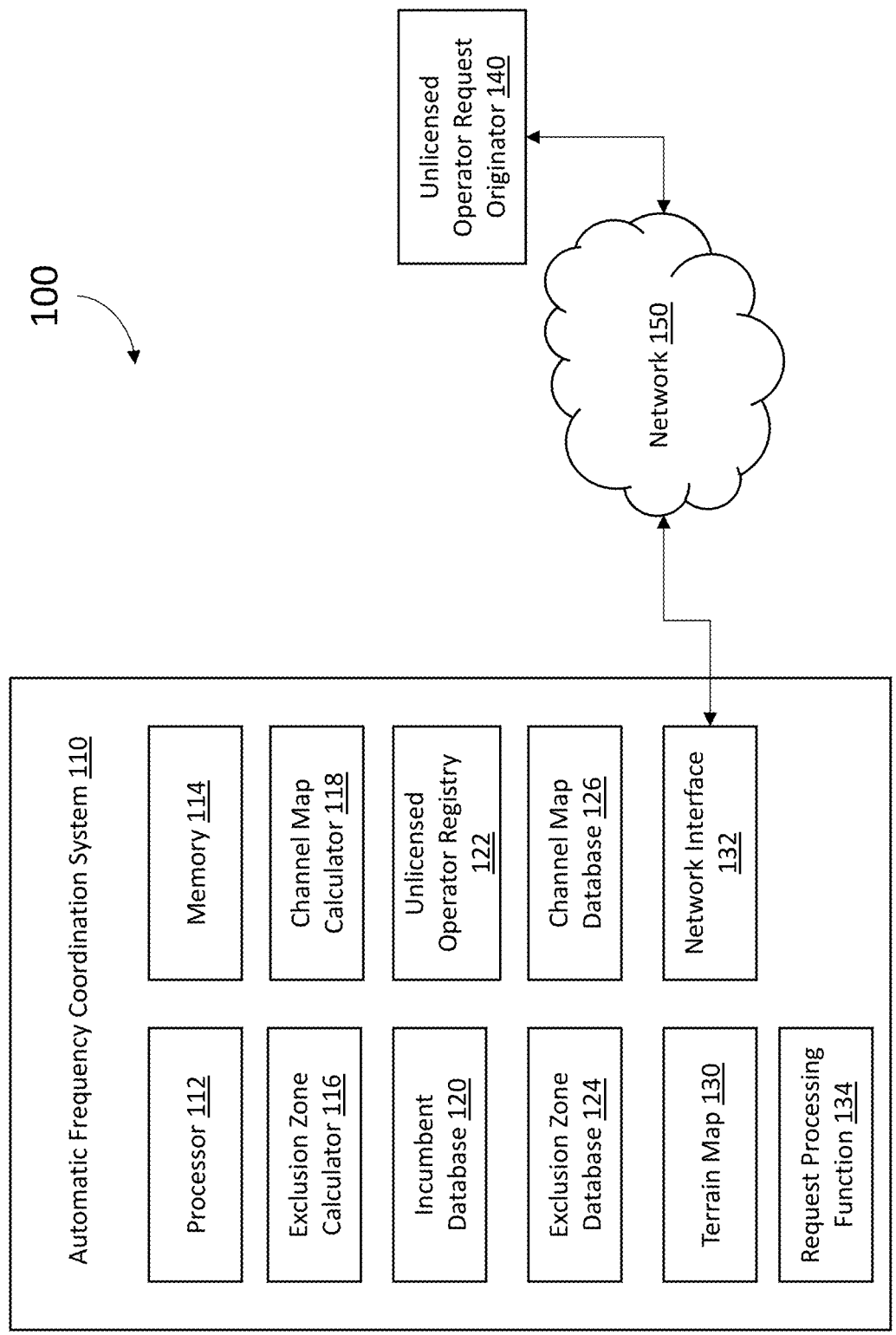
FIG. 1 is a diagram illustrated an example automatic frequency coordination system embodiment.

FIG. 1 is a block diagram illustrating at 100 an example embedment of an automatic frequency coordination (AFC) system 110. The AFC system 110 includes at least one processor 112 coupled to a memory 114, which together execute code to implement the various functions and features of the AFC system 110 disclosed herein. Although the AFC system 110 is illustrated in FIG. 1 as a singular computing system, it should be understood than in other embodiments the function and elements of the AFC system 110 described herein may be distributed over several computing systems. The AFC system 110 includes an exclusion zone calculator 116 which is executed by the processor 112 and comprises algorithms for constructing exclusion zones for fixed incumbent operators as described in detail below. The AFC system 110 also includes an channel map calculator 118 which is executed by the processor 112 and comprises algorithms for constructing one or more channel maps for designated geographic areas as described in detail below. In some embodiments, the AFC system 110 may further include one or more of: an incumbent database 120, and unlicensed operator registry 122, and exclusion zone database 124, a regional channel map 126, and a terrain map 130, each of which are discussed in detail below. Also as shown in FIG. 1, the AFC system 110 may include at least one interface 132 for communicating via a network 150 (such as the Internet for example). In one embodiment in operation, a request for permission to utilize a channel in a shared spectrum band may be received by the AFC system 110 from an unlicensed operator request originator 140 (such as the operator of an RLAN, for example) via the network 150. The AFC system 110 may comprise a request processing function 134 that evaluate the request and demine whether to grant or deny the request as described herein based on correlating the location of the proposed unlicensed operator system with the exclusion zones and/or channel maps constructed by the AFC system 110. In some embodiments, the AFC system 110 may receive and respond to queries about channel availability at one or more specific locations based on correlating the specified location with the exclusion zones and/or channel maps constructed by the AFC system 110. For any of the embodiments described herein, once an unlicensed operator is granted authorization to utilize a channel within the shared spectrum band by the AFC system 110, that authorization may be recorded by the AFC system 110 in the unlicensed operator registry 122.

FIGS. 2-7 illustrate one example process that may be implemented by the exclusion zone calculator 116 for constructing an exclusion zone for a particular fixed incumbent operator, such as a fixed microwave communications receiver facility that operates on licensed channels of a shared spectrum band. In one embodiment, the shared spectrum band may be the 6 GHz band. However the embodiments presented herein are not band specific and may include embodiments involving other shared spectrum bands.

Figure 2:
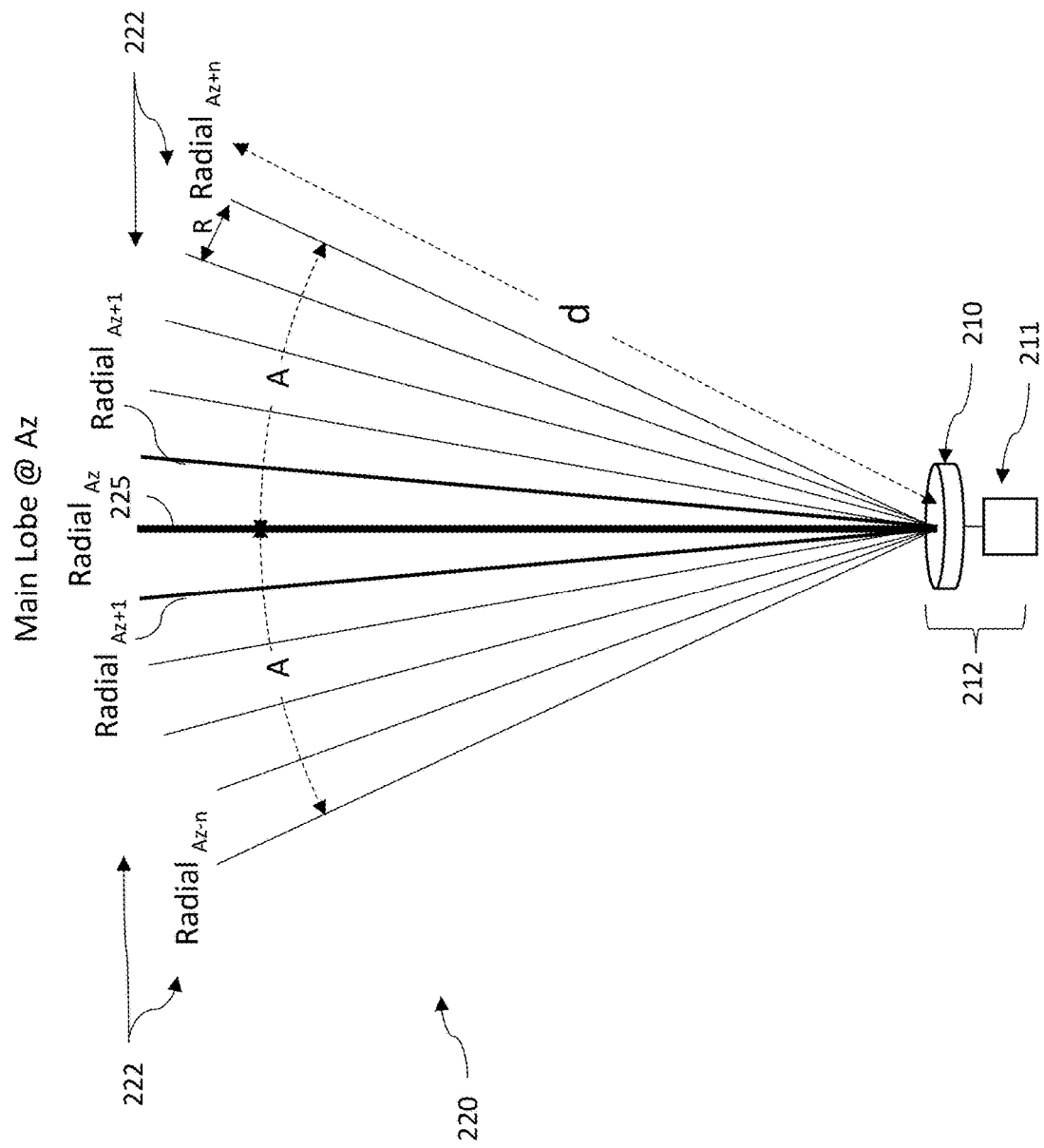
FIGS. 2-7 illustrate an example process for constructing an exclusion zone.

In FIG. 2, a receiver antenna for a fixed incumbent operator is illustrated at 210 and its corresponding receiver at 211. The receiver antenna 210 and its receiver 211 are generally referred to herein as incumbent operator 212. The incumbent receiver antenna 210 will have a gain pattern that comprises a main lobe that is aligned with a particular Azimuth (Az) depending on the physical orientation of the incumbent receiver antenna 210. For example, an incumbent receiver antenna 210 oriented due west would have an Az compass orientation of 270 degrees while an incumbent receiver antenna 210 oriented due west would have an Az compass orientation of 180 degrees. The orientation for any particular antenna may be at any Az from 0 to 360 degrees. As such, the Az that corresponds to the axis of the main lobe of the incumbent receiver antenna 210 may be any arbitrary compass orientation. To initiate the process of constructing an exclusion zone for the incumbent receiver antenna 210, the exclusion zone calculator 116 defines a radial grid 220 comprising a plurality of linear radials 222 that extend outward from the incumbent receiver antenna 210, (which may be considered to define the origin point of the radial grid 220) for a distance, D. The radial 222 alighted with the Az that corresponds to the axis of the main lobe is indicated in the figures as $Radial_{Az}$ shown at 225. The remaining radials 222 fan out evenly spaced across an angle of A degrees from each side of the main lobe $Radial_{Az}$, at a resolution, R, of a predefined angular spacing. In the embodiment shown in FIG. 2, the n radials 222 that fan out clockwise from the $Radial_{Az}$ at 225 are indexed from +1 to +n and thus may be sequentially referred to as $Radial_{Az+1}$, $Radial_{Az+2}$, and so forth to $Radial_{Az+n}$. Similarly, the n radials 222 that fan out counter clockwise from the $Radial_{Az}$ at 225 are indexed from −1 to −n and thus may be sequentially referred to as $Radial_{Az-1}$, $Radial_{Az-2}$, and so forth to $Radial_{Az-n}$.

For example, in some embodiments, the incumbent receiver antenna 210 may comprise an antenna for a fixed microwave communication receiver for a microwave operator in the 6 GHz bandwidth. The signal receiving gain of an incumbent receiving antenna for a microwave operator in the 6 GHz bandwidth is highly directional and can be expected to decrease appreciably at angles off either side of the main lobe. The main beam typically extends about 2 decrees from each side of the Az of the incumbent receiver antenna 210, and its gains falls off by about 30 dB beyond the main beam. For such an antenna the radial grid 220 may be define as having a plurality of radials 222 extending for a distance, D, of 20 kilometers (km), spaced across an angle, A, of 25 degrees from each side of the bore site of the main lobe $Radial_{Az}$, at a resolution R of 2 arc-seconds (that is, each of the radials 222 have an angular spacing of 2 arc-seconds from their neighboring radial 222).

Figure 3:
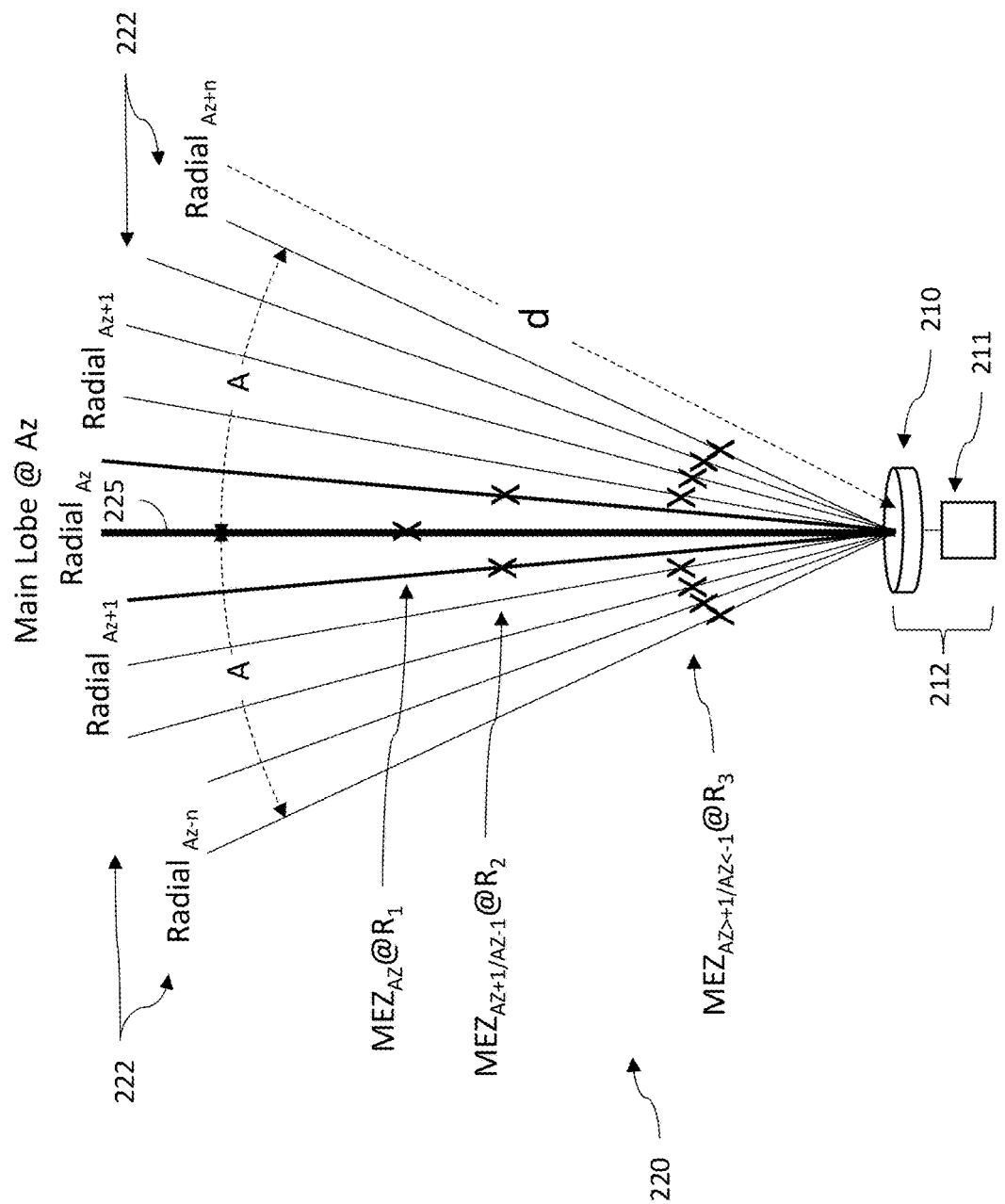

Utilizing this radial grid 220, the exclusion zone calculator 116 defines a minimum exclusion zone (MEZ) radius at a location on the path of each of the plurality of radials 222 as illustrated in FIG. 3. As its name suggests, an MEZ radius defines the minimum distance from the incumbent receiver antenna 210 on that radial 222, within which an unlicensed devices will not be granted permission to operate on a channel licenses for use by the operator of incumbent receiver antenna 210. The MEZ radius be a pre-defined distance established by regulations or standards, or otherwise calculated based on a-priori data analysis. In some embodiments, MEZ radius values for an incumbent receiver antenna 210 may be predefined and stored in the incumbent database 120 and retrieved by the exclusion zone calculator 116.

As an example, in one embodiment, the MEZ radius for each of the plurality of radials 222 may be established based on a-priori data analysis for a fictional standard RLAN having a transmission power of 23 dBm per MHz transmitted from an RLAN antenna height of 1.5 meters and percentage locations 'p' set to 50%, which corresponds to the International Telecommunications Union (ITU) ITU-R P.2108 clutter loss model. Based on that model and standard RLAN, the MEZ for a radial 222 on the main beam may be defined as having a radius, R1, set to 10 km from the incumbent receiver antenna 210. For radials 222 adjacent to the main beam, the MEZ may be defined as having a radius, R2, set to 5 km from the incumbent receiver antenna 210. For the remain radials 222, the MEZ may be defined as having a radius, R3, set to 1 km from the incumbent receiver antenna 210. These MEZ may be represented on the radial grid 220 as shown in FIG. 3 where the location for an $MEZ_{AZ}$ at radius $R_1$ is shown for the main beam, the locations for $MEZ_{AZ+1}$ and $MEZ_{AZ-1}$ at radius $R_2$ are shown for the radials 222 adjacent to the main beam, and the locations for the remaining radials $MEZ_{AZ>+1}$ and $MEZ_{AZ<-1}$ are shown at a radius $R_3$. It should be understood that the radial grid 220 shown in FIGS. 2-7 are simplified by showing only a limited number of radials 222 for the purposes of clarity.

Figure 4:
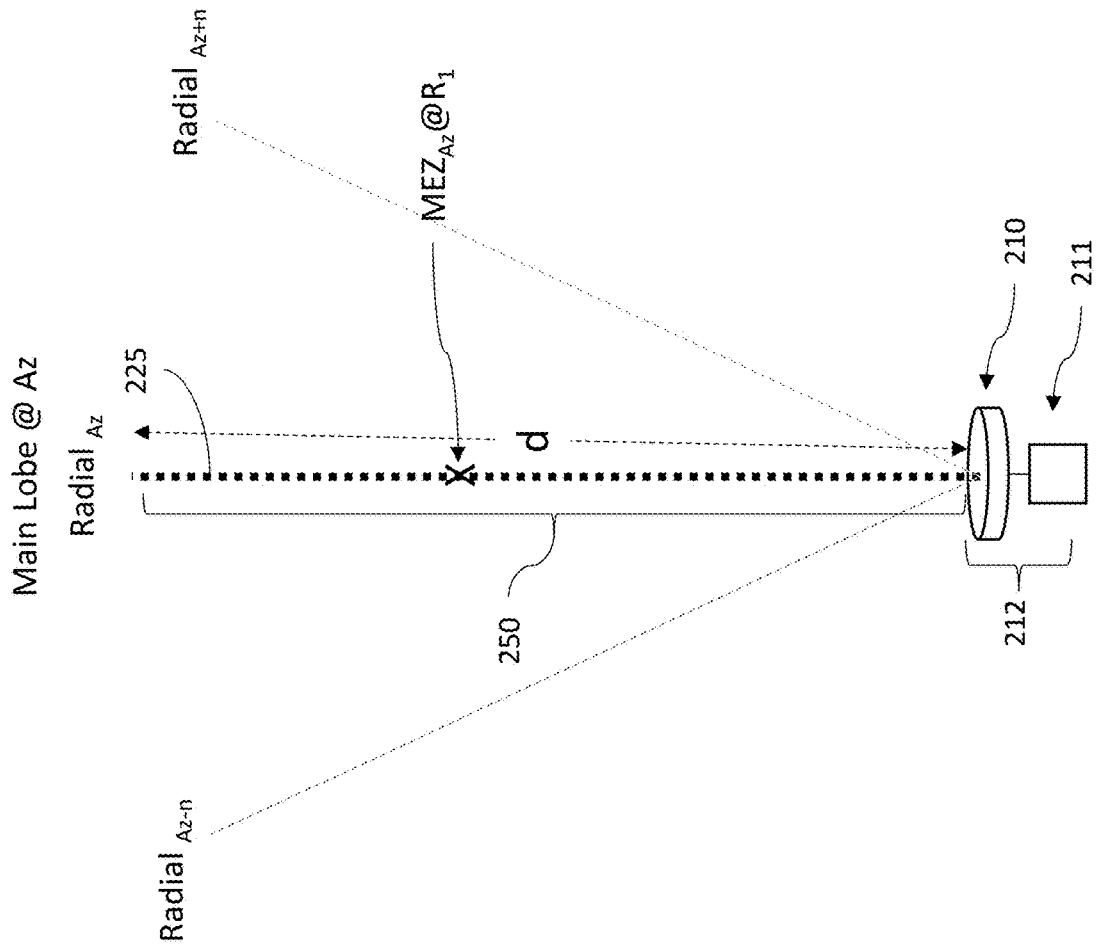
Figure 5:
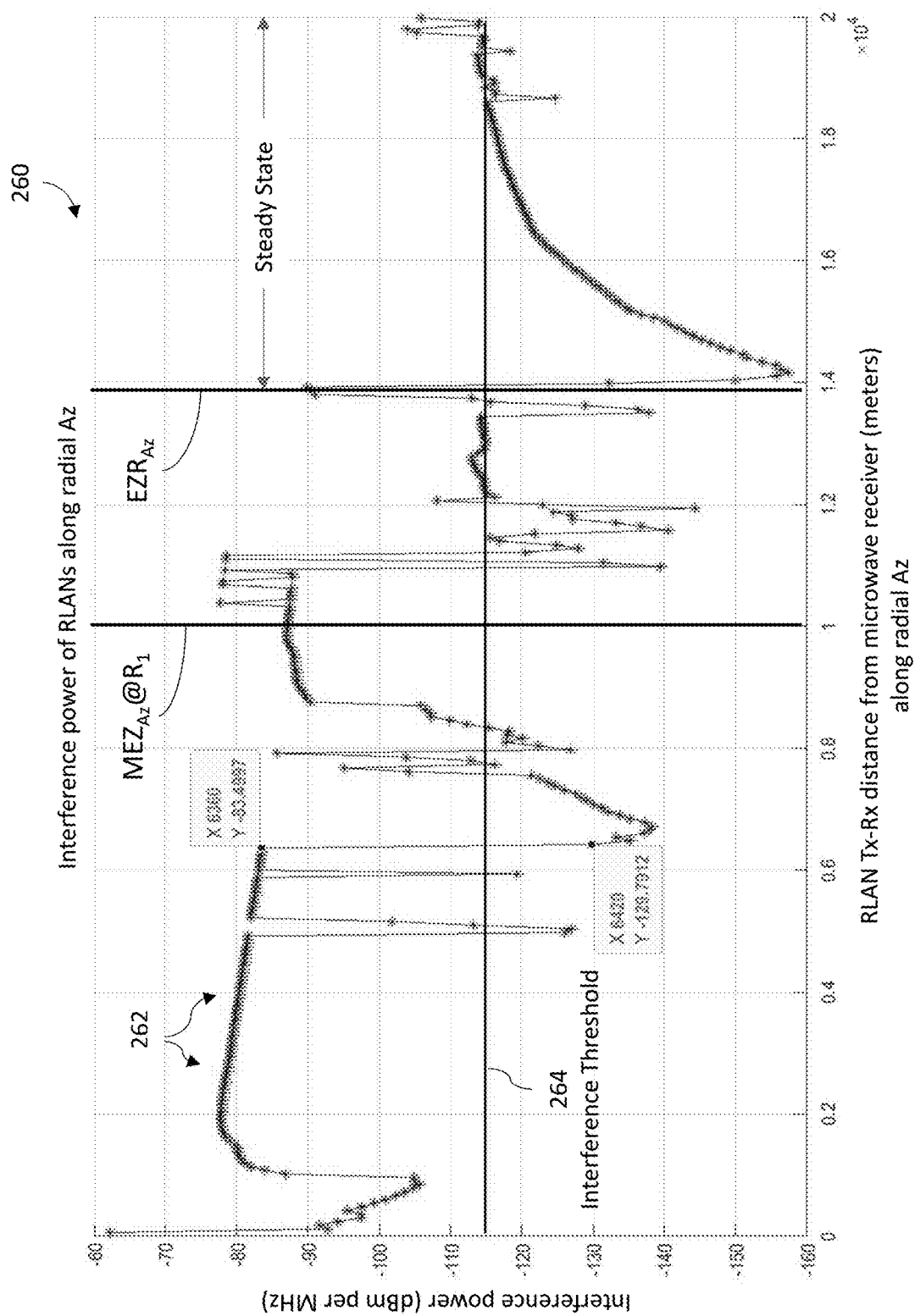

As mentioned above, the MEZ radius may be determined a-priori based on standard models and assumptions, to define a minimum area within which an unlicensed devices will not be granted permission to operate on a channel licenses for use by the operator of incumbent receiver antenna 210. Utilizing the MEZ, the exclusion zone calculator 116 then calculates an Exclusion Zone Radius (EZR) for each of the plurality of radials 222. For example, FIG. 4 and FIG. 5 illustrate the calculation by the exclusion zone calculator 116 of an EZR for the main lobe $Radial_{AZ}$ at the Az which includes a MEZ at distance R1 from the incumbent receiver antenna 210. A plurality of candidate unlicensed operator locations 250 are defined along the distance, d, of the radial the EZR is being calculated for. For example, in one embodiment, the candidate unlicensed operator locations 250 may be positioned at a resolution of one every 60 meters. The exclusion zone calculator 116, for each of the candidate unlicensed operator locations 250, calculates an interference that an unlicensed operator would cause to the incumbent receiver antenna 210. In some embodiments, the candidate unlicensed operator locations 250 may each be defined as comprising instances of a fictional standard RLAN (such as the standard RLAN mentioned above having a transmission power of 23 dBm per MHz transmitted from an RLAN antenna height of 1.5 meters and percentage locations 'p' set to 50%, for example). For example, in one embodiment, for each of the candidate unlicensed operator locations 250, an interference, I, in dBm per MHz, may be computed as:

$I$=Transmit EIRP+Receiver Gain−Path Loss where Transmit EIRP is the effective transmitted equivalent isotropic radiated power from an given instance of the unlicensed operator measured in dBm per MHz, Receiver Gain is the composite gain in dBi of the incumbent receiver antenna 210, and Path Loss is the signal loss in dB incurred by the signal radiated by the unlicensed operator as it propagates to the incumbent receiver antenna 210 due to distance as well as signal attenuation caused by the intervening terrain. For example, a first standard unlicensed operator located on a hilltop and having an uninterrupted line of sight to the incumbent receiver antenna 210 may have less path loss than a second standard unlicensed operator that is located closer to the incumbent receiver antenna 210 than the first standard unlicensed operator, but having its line of sight to the incumbent receiver antenna 210 at least partially blocked (for example, by intervening hills or other features of the local terrain). As such, the first standard unlicensed operator could have a higher potential for interfering with the operations of the incumbent receiver antenna 210 than the second standard unlicensed operator if it were authorized to transmit on a channel used by the incumbent receiver antenna 210. In some embodiments, the path loss may be calculated using generalized methods or signal propagation models. In some embodiments, the AFC system 110 comprises a terrain map 130 comprising a digital topographic representation of geographic surface features for the region of the incumbent receiver antenna 210. The exclusion zone calculator 116 can determine the relative altitude of each candidate unlicensed operator with respect to the incumbent receiver antenna 210 and of terrain features therebetween. In some embodiments, the relevant parameters of the incumbent receiver antenna 210 such as the orientation of its main beam Azimuth, its receiver gain, and its geographic position and altitude, are stored in the incumbent database 120 and retrieved by the exclusion zone calculator 116 to perform the interference power, I, calculation.

It should be understood that while the terrain features contributing to path loss may include naturally occurring features such as hills and valleys, in some embodiments they may also comprise man-made obstructions (such as buildings, for example). For example, in some embodiments, exclusion zone calculator 116 may execute an algorithm to calculate path loss utilizing an Irregular Terrain Model (ITM) which estimates radio propagation losses for frequencies as a function of distance and the variability of the signal in time and space based on electromagnetic theory and signal loss variability expressions. In some embodiments, the exclusion zone calculator 116 may execute the ITM in an area prediction mode to calculate an EZR when a terrain profile from the terrain map 130 is not available, and in a point-to-point prediction mode when a terrain profile from the terrain map 130 is available. In this manner, the exclusion zone calculator 116, calculates the interference power, I, associated with each of the candidate unlicensed operator locations 250 on that radial out to the distance, d.

FIG. 5 is a plot 260 that illustrates an example set of resulting interference power, I, values (shown by the interference power values plotted at 262) verses distance from the incumbent antenna 210. In this example, the values are for interference power, I, along the main lobe $Radial_{Az}$. However, it should be understood that the exclusion zone calculator 116 will perform these calculations along each of the plurality of radials 222 that define the radial grid 220. As shown in FIG. 5, exclusion zone calculator 116 utilizes an interference threshold 264. For this example, an interference threshold of −115 dB, per MHz is illustrated, but in other embodiments other interference thresholds may be used. An interference power value 262 exceeding the interference threshold 264 indicates that an unlicensed operator, if permitted to operate at that location on a licensed channel, will produce an unacceptable level of interference to the operation of the incumbent receiver antenna 210. Conversely, an interference power value 262 not exceeding the interference threshold 264 indicates that an unlicensed operator, if permitted to operate at that location on a licensed channel, is not expected to produce an unacceptable level of interference to the operation of the incumbent receiver antenna 210. As explained above, variations in the interference power values 262 may be caused not only by distance, but also by irregularities in the terrain. Because the plot 260 captures interference power values 262 for the main lobe $Radial_{Az}$, the MEZ radius for this radial is marked at a distance of radius $R_1$. If the plot 260 instead depicts interference power values 262 for an adjacent radial ($Radial_{Az+1}$, $Radial_{Az+1}$) the MEZ radius would instead be marked at a distance of radius $R_2$. Similarly, if the plot 260 instead reflected interference power values 262 for any of the other remaining radials the MEZ radius would instead be marked at a distance of radius $R_3$. As explained above, the MEZ radius defines the minimum distance from the incumbent receiver antenna 210, within which an unlicensed devices will not be granted permission to operate on a channel licensed for use by the operator of incumbent receiver antenna 210. As such, in some embodiments, regardless of the calculated interference power, I, shown for candidate unlicensed operator locations between 0 and the MEZ radius, no authorization will be granted to operate on a channel licensed for use by the operator of incumbent receiver antenna 210.

For those candidate unlicensed operator locations at a distance greater than the MEZ radius, authorization will be granted based on an EZR calculated by the exclusion zone calculator 116 specifically for that radial. More specifically, a moving average filter (MAF) is iteratively applied to the interference power values 262 starting at an interference power value 262 located at a predefined distance from the incumbent receiver antenna 210 less than the MEZ ratio and then recalculated for each next interference power values 262 until the MAF crosses the MEZ and its output reaches a steady state value. In some embodiments, the predefined distance may be zero such that the MAF is iteratively applied beginning with the interference power value 262 for the first occurrence of a candidate unlicensed operator location from the incumbent receiver antenna 210. In other embodiments, the predefined distance may be determined as a function of the filter length equivalent of the MAF. For example, if the filter length equivalent of the MAF is 500 m and the candidate unlicensed operator locations are spaced every 60 m then the MAF may be iteratively applied beginning with the interference power value 262 that is located at 60*(Integer(500/60)+1) or 540 meters less than the MEZ radius.

Once the MAF begins calculating values for candidate unlicensed operator locations at a distance beyond the MEZ radius for that radial, the exclusion zone calculator 116 evaluates the output from the MAF at each iteration to determine a distance where the output of the MAF reaches a steady state, referred to herein as the steady state distance. In some embodiments, a steady state output from the MAF is defined as the state where the output of the MAF stays below the interference threshold 264 for a pre-determined threshold distance (for example, 2 km). In the FIG. 5, the MAF is indicated to reach a steady state value at approximately 14 km from the incumbent receiver antenna 210. The exclusion zone calculator 116, at that point, stops further MAF calculations and stores the steady state distance as the EZR for that radial.

Figure 6:
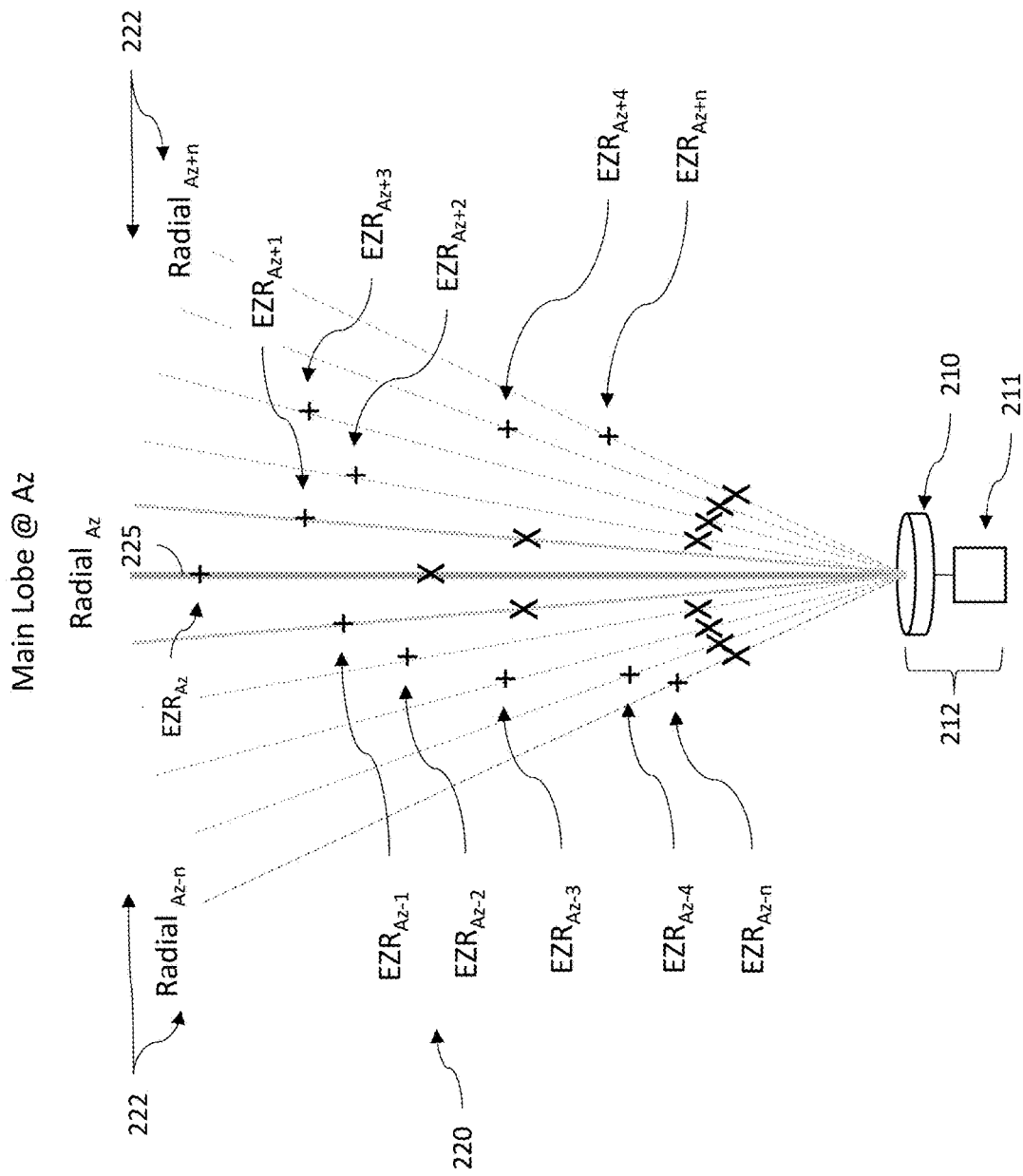

As discussed above, this process is repeated to establish an EZR for each of the plurality of radials 222. This is illustrated in FIG. 6 where each of the plurality of radials 222 has an associated EZR calculated by the exclusion zone calculator 116. In some embodiments, in order to construct a continuous polygonal exclusion zone, the exclusion zone calculator 116 applies an averaging filter to the EZR. The averaging filter may comprise a window function such as, but not limited to, a Hamming window.

Figure 7:
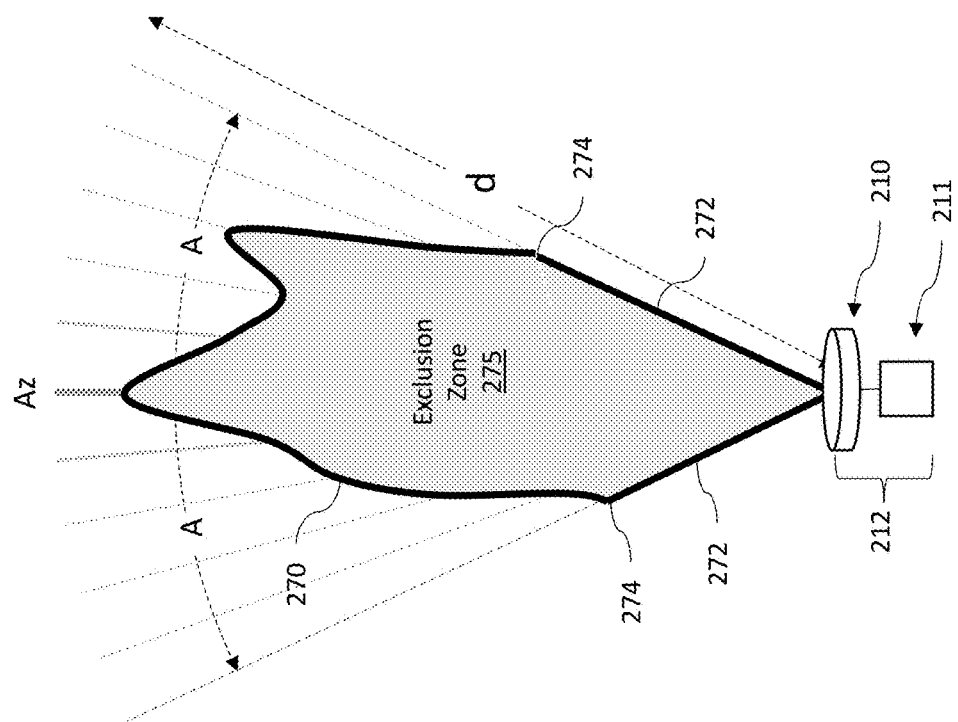

As illustrated in FIG. 7, in one embodiment, the averaging filter may be applied to the EZR of each radial from Az−n to Az+n to produce a smooth curve 270 between the EZR of the outer radials Radial$_{Az-n}$ and Radial$_{Az+n}$. Linear boundary lines 272 may then be extended from the terminal ends 274 of the smooth curve 270 to the origin of the radial grid 220 at the incumbent receiver antenna 210 to form the closed polygon geographically defining the exclusion zone 275 for the incumbent receiver antenna 210. In some embodiments, the resulting exclusion zone 275 may be stored by the AFC system 110 in an exclusion zone database 124 for future reference for determining whether or not to authorize unlicensed operators, as discussed in greater detail below.

Note that each exclusion zone 275 created for an incumbent operator 212 will be tagged in the exclusion zone database 124 with the set of channels that corresponds to the incumbent operator's 212 reception channels. These are the channels that will need to be blocked for unlicensed use by the AFC system 110 if the unlicensed operator seeking permission to transmit is located is inside the exclusion zone 275. Generally speaking, when the request processing function 134 of the AFC system 110 receives a request to operate in a shared spectrum band from an unlicensed operator request originator 140, the AFC system 110 may utilize the exclusion zone 275 to make the authorization determination. If the request is for an unlicensed operator that is not located within the exclusion zones 275 of any incumbent operation managed by the AFC system 110, then the AFC system 110 can authorize the unlicensed operator to use any channel of the shared spectrum band without concern that the unlicensed operator will interfere with the operation of an incumbent antenna. If the request is for an unlicensed operator that is located within an exclusion zones 275 of an incumbent operation managed by the AFC system 110, then the AFC system 110 may authorize the unlicensed operator to use a channel of the shared spectrum band not used by the incumbent antenna associated with that exclusion zone 275, but prohibit use of any channel that is used by the incumbent antenna associated with that exclusion zones 275. In the case where the request is for an unlicensed operator that is located within a region where multiple exclusion zones 275 overlap, the AFC system 110 will prohibit use of any channel that is used by any of the incumbent antennas 210 associated with the overlapping exclusion zones 275, and only authorize the unlicensed operator to use a channel of the shared spectrum band not used by any of the incumbent antennas 210.

Figure 8:
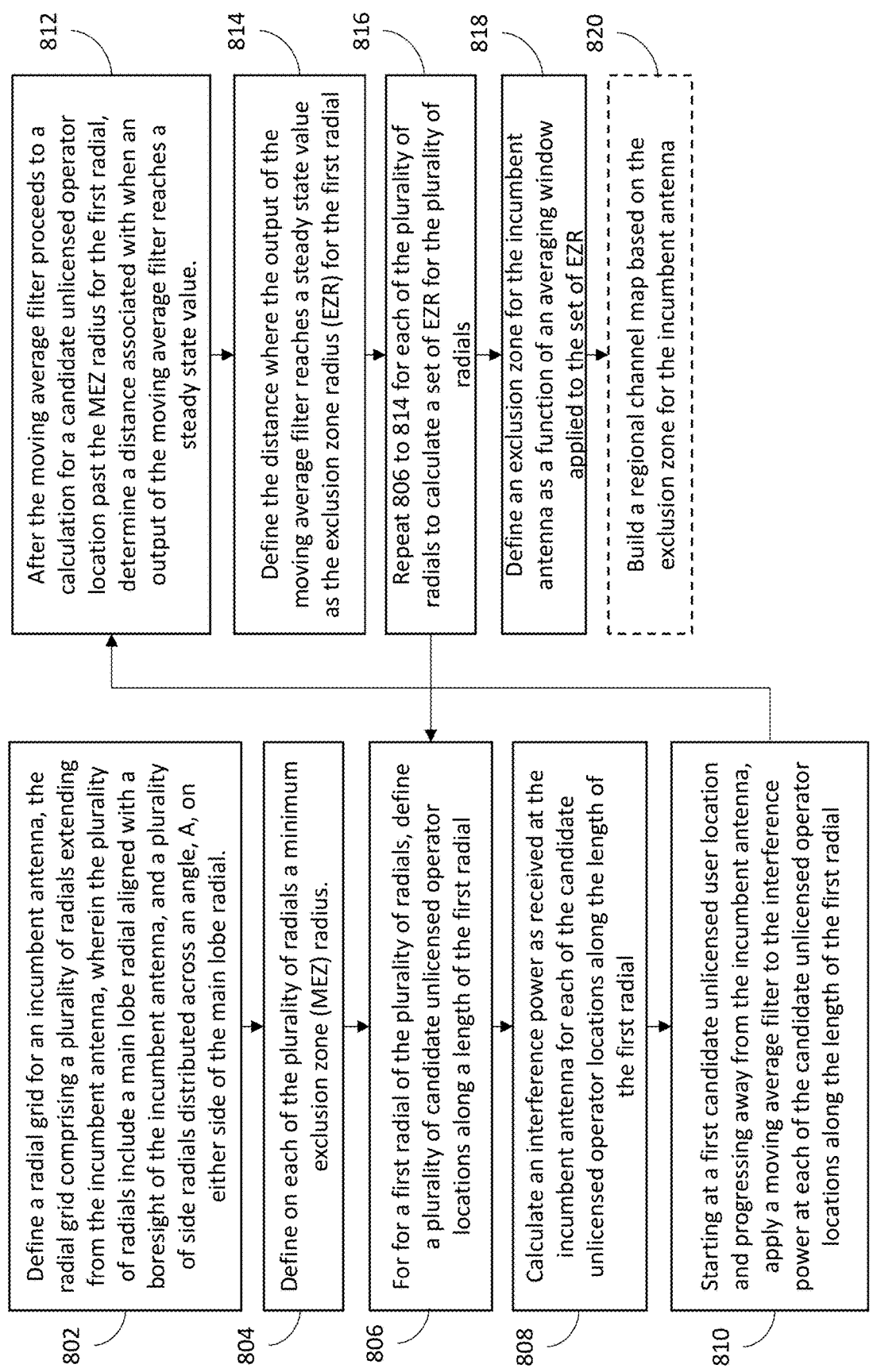
FIG. 8 is a flow chart illustrating a method for constructing an exclusion zone.

FIG. 8 is a flow chart for a method 800 corresponding to an example process embodiment executed by the exclusion zone calculator 116 of the AFC system 110 to construct an exclusion zone such as illustrated in FIG. 7. It should be understood that the features and elements described herein with respect to the method 800 of FIG. 8 may be used in conjunction with, in combination with, or substituted for elements of any of the other embodiments discussed herein and vice versa. Further, it should be understood that the functions, structures and other description of elements for embodiments described herein may apply to like or similarly named or described elements across any of the figures and/or embodiments describe therewith.

The method begins at 802 with defining a radial grid for an incumbent antenna, the radial grid comprising a plurality of radials extending from the incumbent antenna. The plurality of radials include a main lobe radial aligned with a boresight of the incumbent antenna, and a plurality of side radials distributed across an angle, A, on either side of the main lobe radial The method proceeds to 804 with defining on each of the plurality of radials a minimum exclusion (MEZ) radius. The MEZ radius may be established based on standard models and assumptions and/or a-priori data analysis. The method proceeds to 806 with defining a plurality of candidate unlicensed operator locations along a length of a first radial. In some embodiments, the candidate unlicensed operator may represent a standard RLAN. At 808 an interference power as received at the incumbent antenna is calculated for each of the candidate unlicensed operator locations along the length of the first radial. The interference power may be calculated as a function of the effective transmitted equivalent isotropic radiated power from the unlicensed operator, receiver gain of the incumbent receiver antenna 210 and receiver 211, and a path loss incurred by the signal radiated by the unlicensed operator as it propagates to the incumbent receiver antenna 210 due to distance as well as signal attenuation caused by the intervening terrain. In some embodiments, an ITM model may be utilized to calculate the path loss. Starting at a first candidate RLAN location and progressing away from the incumbent antenna, the method at 810 includes applying a moving average filter to the interference power at each of the candidate unlicensed operator locations along the length of the first radial. At 812, after the moving average filter proceeds to a calculation for a candidate unlicensed operator location past the MEZ Radius for the first radial, determine a distance associated with when an output of the moving average filter reaches a steady state value. The stead state distance where the output of the moving average filter reaches a steady state value is defined at 814 as the exclusion zone radius (EZR) for the first radial. The process of 804 to 814 is then repeated for each of the plurality of radials in order to generate a set of EZR for the plurality of radial. At 818, an exclusion zone for the incumbent antenna is obtained by applying an averaging filter to the set of the EZR and constructing an closed geographic area between the smoothed EZR curve and the incumbent antenna. In some embodiments, as indicated at 820, the derived exclusion zone may be stored and then further utilized to generate a regional channel map to facilitate evaluation of channel authorization requests from unlicensed operators. Such channel maps are now further discussed below.

In some embodiments, the AFC system 110 further comprises a channel map calculator 118 which may be executed by the processor to construct a channel map of a geographic area which identifies regions falling within one or more exclusion zone. The channel map may be referenced by the request processing function 134 of the AFC system 110 to efficiently correlate the location where an unlicensed operator is requesting authorization to operate, with shared spectrum band channel availability at that location. More specifically, the channel map calculator 118 subdivides a geographic region into a grid of a predefined resolution resulting in a plurality of grid locations each corresponding to a geographic local area within the geographic region. Each of the grid locations may be referred to as a channel subdivision with the AFC system 110 maintaining for each channel subdivision an associated listing of shared spectrum band channel availability.

Figure 9:
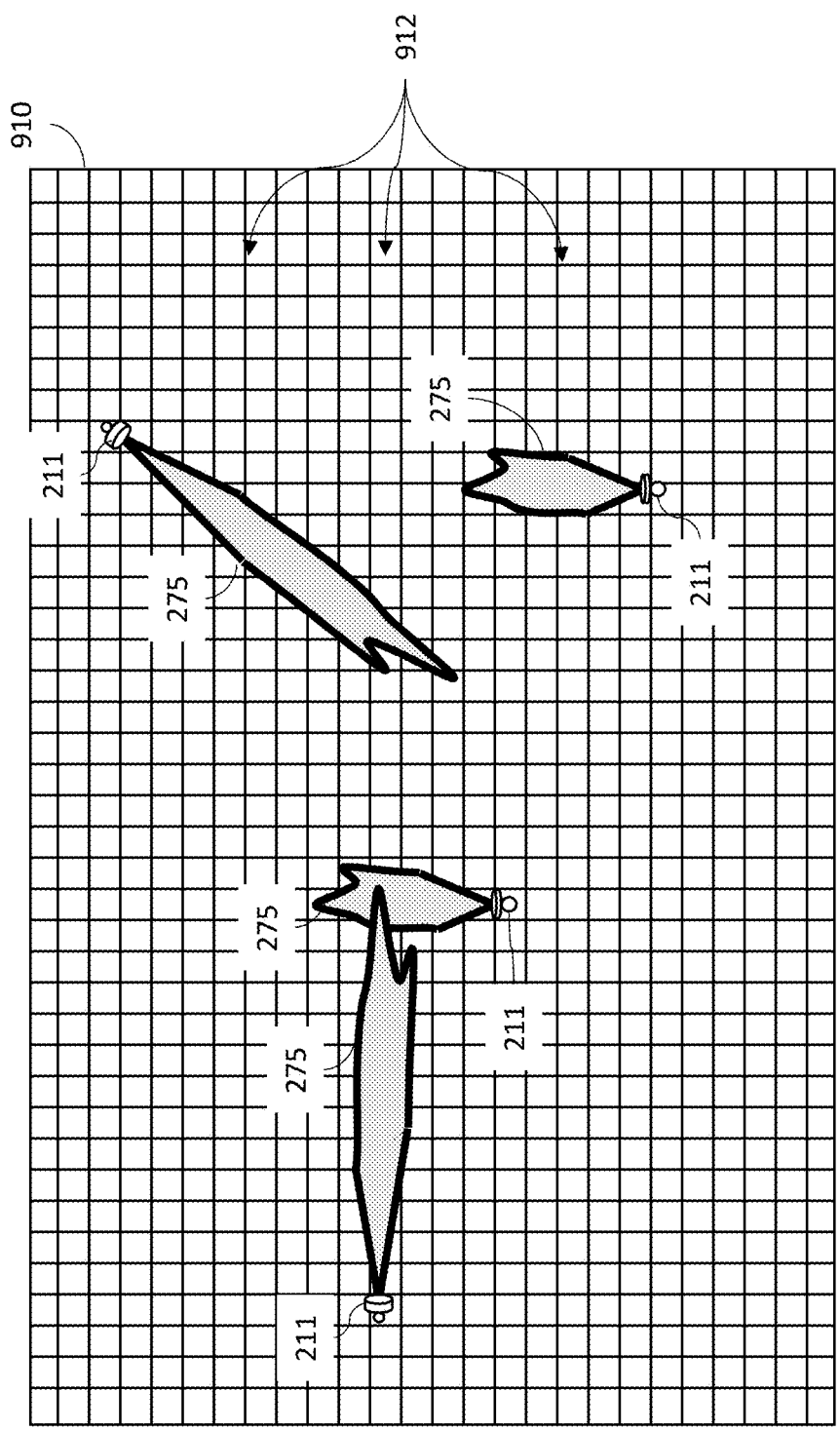
FIG. 9 is a diagram illustrating regional area subdivided into a grid for constructing a channel map showing exclusion zones for the regional area.

For example, referring to FIG. 9, a metropolitan area is shown that is subdivided into a grid 910 comprising a plurality of channel subdivision 912. Each channel subdivision 912 represents a geographic area the is a segment of the metropolitan area. For example, in one embodiment each of the channel subdivision 912 corresponds to an area of 500×500 meters. In other embodiment, the channel subdivisions 912 may have other dimensions and/or aspect ratios and/or other polygonal shapes. Further, although the channel subdivisions 912 in FIG. 9 are shown as being uniform in area, in other embodiments, the channel subdivisions 912 can be non-uniform in area.

Figure 9A:
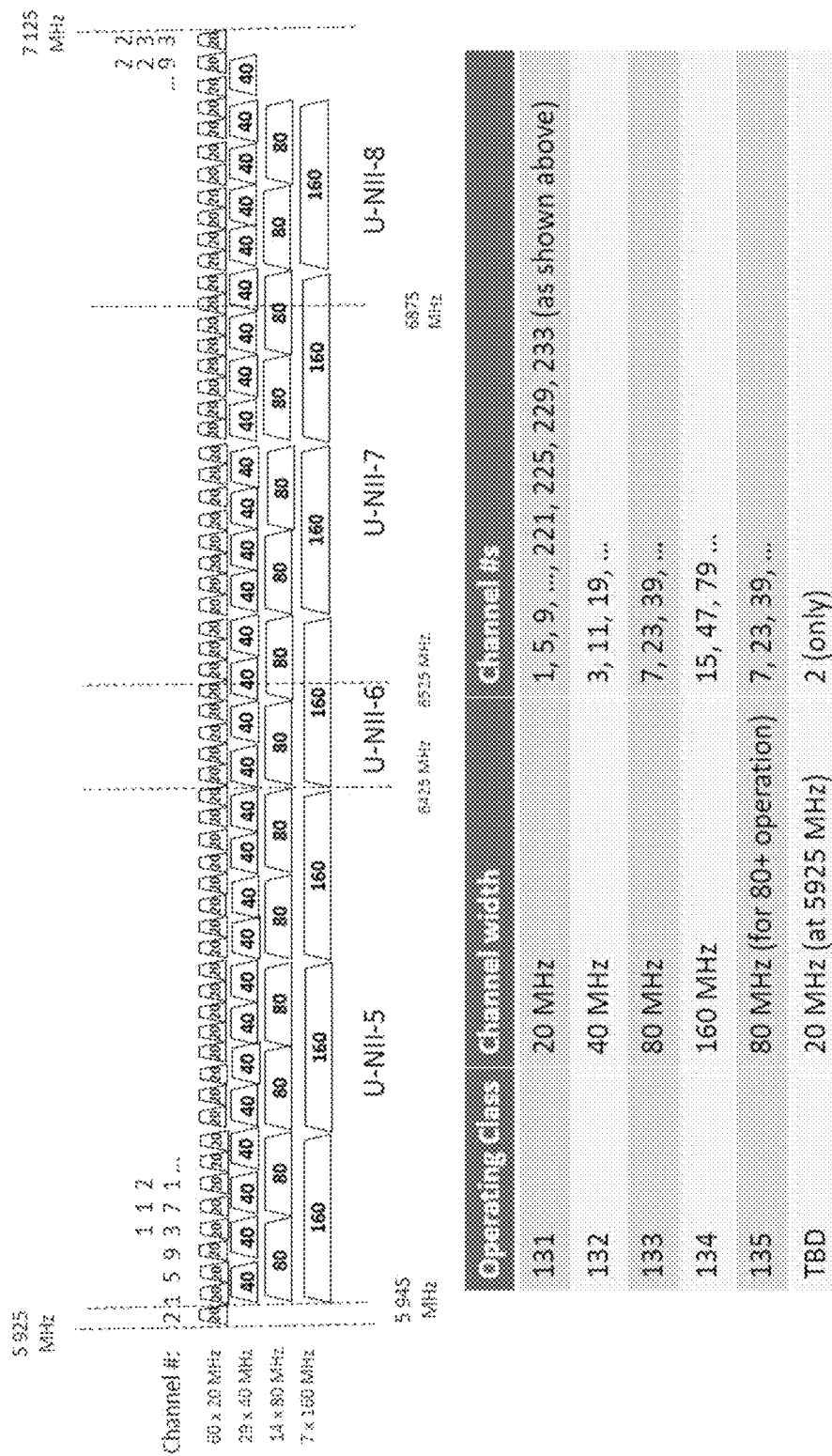
FIG. 9A is a diagram illustrating am example channel rastor for the 6-GHz shared spectrum band.

In some embodiments, the channel map calculator 118 also subdivides the shared spectrum band into channels of "x MHz" each where "x" MHz is a channel bandwidth. By regulation in some jurisdictions, the 6-GHz shared spectrum band is subdivided into channels where the "x MHz" is 20 MHz, 40 MHz, 80 Mhz, or 160 MHz. A corresponding channel rastor for the 6-GHz spectrum is shown in FIG. 9A and FIG. 9B illustrates an example channelization of the 6-GHz shared spectrum band based on 80 MHz channels.

Within the geographic area covered by the grid 910 there may be one or more incumbent antennas 210 (each associated with an incumbent receiver 211 and incumbent operator 212) as illustrated in FIG. 9. In one embodiment, the channel map calculator 118 superimposes the locations of those incumbent antennas 210 and the shape and orientation of their associated exclusion zones 275 onto the grid 910 and determines which channel subdivisions 912 are at least partially occupied by at least some portion of an exclusion zone 275.

The AFC system 110 can thus identify the location on the grid 910 of a plurality of incumbent antennas 211, and the channel subdivisions 912 that are at least partially overlapped by their associated exclusion zones 275. The restricted channels for each exclusion zone 275 that overlaps a channel subdivision 912 are determined and stored as part of the regional channel map database 126 of the AFC system 110 to create the listing of shared spectrum band channel availability within the area of that channel subdivision 912. In some embodiments, the channel map calculator 118 determines the listing of shared spectrum band channel availability at each channel subdivision 912 by evaluating the use by licensed incumbent operators of channels at each of the possible channel bandwidths (for example, for each of 20 Mhz, 40 Mhz, 80 Mh and 160 Mhz bandwidth channels).

However, it should be noted that that determining shared spectrum band channel availability in a channel subdivision 912 within an exclusion zone 275 is not as straightforward as determining the channel used by that incumbent receiver antenna 210. For example, referring to FIG. 9A, it can be seen that a lower bandwidth channel may utilize the same segment of the shared spectrum band as a higher bandwidth channel. Accordingly, a licensed incumbent operator's use of a given channel means not only that unlicensed operators are barred from using that specific channel within the exclusion zone, but they are also barred from using any channel whose spectrum overlaps with the channel used by the incumbent operator. For example, referring to FIG. 9A, if the 20 MHz channel number 5 is license for use by an incumbent operator, then the 40 MHz channel number 3, the 80 MHz channel number 7 and the 160 MHz channel number 15 are all also necessarily restricted from unlicensed use within the exclusion zone because use of those channels 3, 7 and 15 by an unlicensed operator within the exclusion zone will interfere with the incumbent operator's use of channel 5. Likewise, if the 80 MHz channel number 7 is license for use by an incumbent operator, then the 20 MHz channels 1, 5, 9 and 13, the 40 MHz channels 3 and 11, and the 160 MHz channel number 15 are all also necessarily restricted from unlicensed use within the exclusion zone.

In some embodiments, the process of degerming which shared spectrum band channels within a given exclusion zone are restricted from use by unlicensed operators can be effectively based on the analysis of the channels for the resolution bandwidth of 20 MHz (i.e., the channels of the shared spectrum band with the smallest bandwidth). Referring again to the channelization rastor is shown in FIG. 9A, it can be seen that the channel numbers assigned to higher bandwidth channels are a function of the average of the channel numbers assigned to the next lower bandwidth channels. For example, the channel number 3 of the first 40 MHz channel is the average of the next lower bandwidth 20 MHz channel numbers 1 and 5. Utilizing this relationship, the channel map calculator 118 can, for example. assess that if either of the 20 MHz channel numbers 1 or 5 are restricted from unlicensed use within the exclusion zone (e.g., used by the incumbent operator 212), then the 40 MHz channel number 3 is also restricted from unlicensed use. Similarly, the first 80 MHz channel is channel number 7, which is the average of the 20 MHz channel numbers 1, 5, 9 and 13 that share the same segment of spectrum as 80 MHz channel number 7. The channel map calculator 118 can therefore infer that if any of channel numbers 1, 5, 9 and 13 are restricted from unlicensed use within the exclusion zone, then channel number 7 is likewise restricted. Similarly, the first 160 MHz channel is channel number 15, which is the average of the 20 MHz channel numbers 1, 5, 9, 13, 17, 21, 25 and 29 that share the same segment of spectrum as 160 MHz channel number 15. The channel map calculator 118 can therefore infer that if any of channel numbers 1, 5, 9, 13, 17, 21, 25 and 29 are restricted from unlicensed use within the exclusion zone, then channel number 15 is likewise restricted. Utilizing these channel number relationships, the channel map calculator 118 can efficiently start with the specific channel numbers for channels licensed to an incumbent operator, and from there determine the channel numbers for all channels within that incumbent antenna's exclusion zone that are consequently restricted from being used by unlicensed operators with the exclusion zone. Given these determinations, the channel map calculator 118 may create the listing of shared spectrum band channel availability for each channel subdivision 912, resulting in the channel map 1000 shown in FIG. 10.

Figure 10:
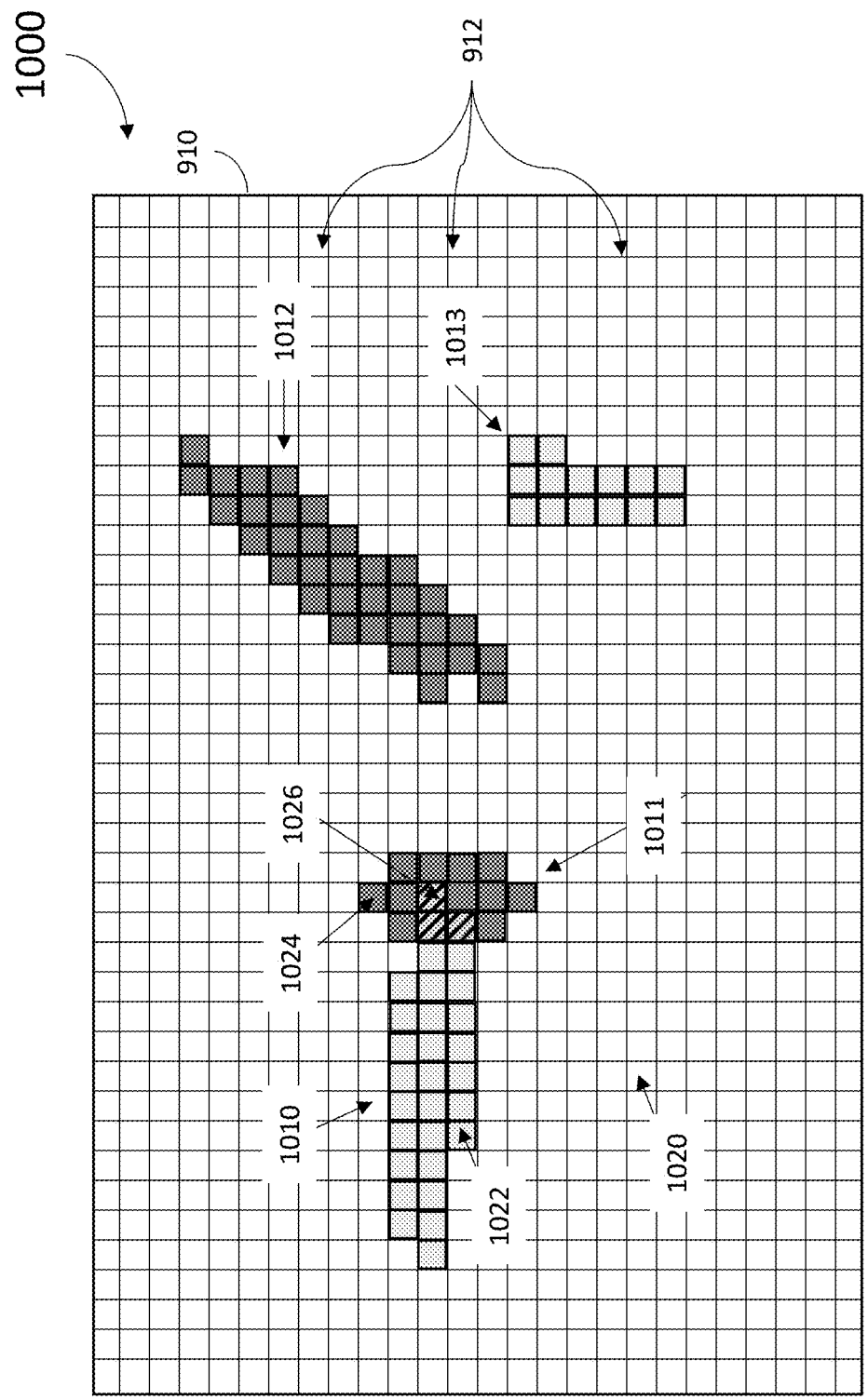
FIG. 10 is a diagram illustrating a channel map showing exclusion zones for the regional area.

In the channel map 1000 shown in FIG. 10, for each channel subdivision 912 of grid 910 the AFC system 110 maintains in channel map database 126 a listing of shared spectrum band channel availability that comprises a set of channels that are marked as restricted depending on the overlap of exclusion zones with the channel subdivision 912 as explained above. Channels marked as restricted means that at least part of the spectrum for those channels are in use by an incumbent operator and hence are unavailable for unlicensed operator use. For example, in channel map 1000, channel subdivision 912 that include a first exclusion zone are shown at 1010, channel subdivision 912 that include a second exclusion zone are shown at 1011, channel subdivision 912 that include a third exclusion zone are shown at 1012, and channel subdivision 912 that include a fourth exclusion zone are shown at 1013.

For any channel subdivision 912 (such as the channel subdivision 912 shown at 1020 for example) where there is no overlap with any of the exclusion zones 1010, 1011, 1012 or 1013, the listing of shared spectrum band channel availability will include no restricted channel so that the entire shared spectrum band is potentially available for use by an unlicensed operator's transmitter. The entire spectrum is available for the AFC system 110 to authorize to the unlicensed operator at the channel subdivision 912 shown at 1020. For a channel subdivision 912 where there is an overlap with an exclusion zone, the listing of shared spectrum band channel availability will include restricted channels. For example, for the channel subdivision 912 shown at 1022, the listing of shared spectrum band channel availability will include all the restricted channels associated with exclusion zone 1010. The AFC system 110 will therefore not authorize an unlicensed operator located in the channel subdivision 912 shown at 1022 to transmit on the restricted channels associated with exclusion zone 1010. Similarly, for the channel subdivision 912 shown at 1024, the listing of shared spectrum band channel availability will include all the restricted channels associated with exclusion zone 1011. The AFC system 110 will therefore not authorize an unlicensed operator located in the channel subdivision 912 shown at 1024 to transmit on the restricted channels associated with exclusion zone 1011.

In some implementations, for a channel subdivision 912 such as shown at 1026, the listing of shared spectrum band channel availability will include all the restricted channels associated with the multiple exclusion zones present in that channel subdivision. That is, the listing of shared spectrum band channel availability for the channel subdivision 912 shown at 1026 will include all the restricted channels associated with exclusion zone 1010 and exclusion zone 1011. The AFC system 110 will therefore not authorize an unlicensed operator located in the channel subdivision 912 shown at 1026 to transmit on the restricted channels associated with either exclusion zone 1010 or exclusion zone 1011. For example, supposing that exclusion zones 1010 and 1011 associated with two incumbent microwave receivers whose licensed reception is in 80 MHz channel 3 (6105-6185 MHz) and 80 MHz channel 5 (6265-6345 MHz) respectively have an overlap with the channel subdivision 1026. This means that these channels 3 and 5 are occupied by the incumbent operators and hence is not available for unlicensed use at the channel subdivision 1026. Therefore, the AFC system 110 can therefore authorize an RLAN requesting to operate in the location of channel subdivision 1026 to transmit in the frequency space of any of the 80 MHz channels shown in FIG. 9B with the exception of channels 3 and 5. Moreover, the AFC system 110 can respond to queries asking what the available bandwidth for unlicensed operators is within any of the channel subdivisions 912. For example, within the channel subdivision 1026, there is an available bandwidth for unlicensed operators of 80 MHz×(14−2)=960 MHz.

As discussed above, by utilizing exclusion zones and channel maps constructed as discussed above, the AFC system 110 can response to a requests for authorizations from non-licensed operators in a manner that prevent interference with fixed incumbent operators. The request processing function 134 executed by the processor 112 can evaluate the request and demine whether to grant or deny the request based on correlating the location of the proposed unlicensed operator system with a channel subdivision 912 of a channel map 1000 and determine if the request involves unlicensed use of a segment of the shared spectrum band that corresponds to a restricted channel in that channel subdivision 912. Note that if there is ambiguity in the regarding which channel subdivision 912 the location of the proposed unlicensed operator system falls within (such as if the proposed location falls on or very near the boundary between two or more channel subdivisions 912), the request processing function 134 may perform its evaluation individually on each of the neighboring channel subdivisions 912 and the shared spectrum band channel availability determined from the combined results.

As discussed below, there are several methods that the AFC system 110 may implement to determine whether to grant such authorizations.

In one embodiment, the request processing function 134 executes a method to determine whether to grant authorizations based on an a priori created channel map of available bandwidth. That is, the AFC system 110 generates a channel map 1000 for a geographical region as disclosed above, and stores that channel map 1000 in its channel map database 126 for future reference. Determinations to grant or deny an unlicensed operator authorization request is made entirely by the AFC system 110 referencing the listing of shared spectrum band channel availability for the channel subdivision 912 associated with the location specified by the request. The data generated from the process of constructing the exclusion zones need not be saved or further utilized for this method. The channels available (and the hence the available bandwidth) for the proposed unlicensed operator location is extracted from the channel map. The AFC authorizes the unlicensed operator to transmit in the not restricted channels at a certain EIRP (for example, the EIRP that was used for the creation of the exclusion zones), which is typically 23 dBm per MHz but may be another transmit power. With this method, the AFC system 110 may process requests very quickly since very little real-time computation is involved to correlate the request to the relevant listing of shared spectrum band channel availability.

In another embodiment, the channel map 1000 for the entire area is not created by the AFC system 110 a priori. Instead, the exclusion zones for all incumbent operators in the area are created a priori and saved in the exclusion zone database 124. The listing of shared spectrum band channel availability is generated in real-time at the time the request is received by the request processing function 134 by correlating the request location to a channel subdivision 912 and evaluating the channel use of all incumbent operators with an exclusion zone present in that channel subdivision 912. In other words, the channel map calculator 118 processes the relevant exclusion zone channel information for just that channel subdivision 912 rather than for an entire channel map 1000. This method is less memory intensive because, listing of shared spectrum band channel availability is generated in real-time at the time the request and does not involve storing those listings for a large number of channel subdivisions 912.

In another embodiment, the request processing function 134 entirely utilizes real-time computations of the interference caused by the unlicensed operator transmission to nearby incumbent operators. In some embodiments, this method may be implemented completely free of storage requirements. In this method, the request processing function 134 first identifies the location of incumbent receiving antennas that are within a threshold distance, T, from the proposed unlicensed operator location. For example, in one embodiment, the threshold distance, T, may be on the order of 30 km. One identified, the request processing function 134 computes the interference caused by the unlicensed operator's transmission to each of the incumbents discovered.

The interference power, I, in dBm per MHz, received at each of the incumbent antenna's due to the unlicensed operator may be computed as:

$$I = \text{Transmit EIRP} + \text{Receiver Gain} - \text{Path Loss}$$

where Transmit EIRP is the effective transmitted equivalent isotropic radiated power from the proposed unlicensed operator measured in dBm per MHz, Receiver Gain is the composite gain in dBi of the incumbent antenna, and Path Loss is the signal loss in dB incurred by the signal radiated by the unlicensed operator as it propagates to the incumbent antenna due to distance as well as signal attenuation caused by the intervening terrain. In some embodiments, the proposed unlicensed operator may be defined as the fictional standard RLAN having a transmission power of 23 dBm per MHz transmitted from an RLAN antenna height of 1.5 meters and percentage locations 'p' set to 50% as discussed above. In some embodiments, an ITM model may be utilized to calculate the path loss, or another method utilized as discussed above. The AFC system 110 proceeds to evaluate the computed interferences and filter out the channels associated with incumbent operators to which the interference from the proposed unlicensed operator exceeds the predefined interference threshold (for example, −115 dBm per Mhz). The remaining channels in the shared spectrum band are available for used by the unlicensed operator.

EXAMPLE EMBODIMENTS

Example 1 includes an automatic frequency coordination (AFC) system for authorizing unlicensed operator utilization of a shared spectrum band comprising channels licensed to incumbent operators, the system comprising: a processor coupled to a memory; and an exclusion zone calculator executed by the processor, the exclusion zone calculator configured to construct an exclusion zone for an incumbent receiver antenna operating on a licensed channel of the shared spectrum band, wherein the exclusion zone calculator is configured to construct the exclusion zone by: calculating a set of exclusion zone radiuses along a plurality of radials of a radial grid based on applying a moving average filter to interference power values calculated for a plurality of locations along a length of each of the plurality of radials; and applying an averaging filter to the set of exclusion zone radiuses to define the exclusion zone between the exclusion zone radiuses and the incumbent receiver antenna.

Example 2 includes the system of Example 1, wherein the plurality of radials extend from the incumbent receiving antenna, wherein the plurality of radials include a main lobe radial aligned to an azimuth of a boresight of the incumbent receiver antenna, and a plurality of side radials distributed across an angle, A, on either side of the main lobe radial.

Example 3 includes the system of any of Examples 1-2, wherein the exclusion zone calculator is configured to calculate the interference power values by calculating an interference power as received at the incumbent receiver antenna for each of a plurality of candidate unlicensed operator locations along a length of each of the plurality of radials.

Example 4 includes the system of any of Examples 1-3, wherein the exclusion zone calculator is configured to define on each of the plurality of radials a respective minimum exclusion zone (MEZ) radius; and calculating the set of exclusion zone radiuses by: calculating a respective exclusion zone radius for each of the plurality of radials by applying the moving average filter to the interference power calculated for each of a plurality of candidate unlicensed operator locations along the length of each of the plurality of radials; and determining a steady state distance based on when an output of the moving average filter reaches a steady state value at a distance from the incumbent receiver antenna greater than the respective MEZ radius for each of the plurality of radials.

Example 5 includes the system of any of Examples 1-5, further comprising: a network interface; and a request processing function; wherein the request processing function processes requests for authorizing unlicensed operator use of the shared spectrum band received by the automatic frequency coordination system via the network interface based at least in part on the exclusion zone.

Example 6 includes the system of Example 5, wherein the exclusion zone is stored in an exclusion zone database accessible to the request processing function.

Example 7 includes the system of any of Examples 1-6, wherein the interference power values calculated for the plurality of locations along the length of each of the plurality of radials are each computed at each location as a function of effective transmitted equivalent isotropic radiated power, receiver gain of the incumbent receiver antenna, and a path loss.

Example 8 includes the system of Example 7, wherein the exclusion zone calculator is configured to execute an algorithm to calculate the path loss utilizing an Irregular Terrain Model.

Example 9 includes the system of Example 8, further comprising a terrain map that includes a digital topographic representation of geographic surface features for a geographic region comprising the incumbent receiver antenna;

wherein the exclusion zone calculator utilizes the terrain map to calculate the path loss utilizing the Irregular Terrain Model.

Example 10 includes the system of any of Examples 1-9, further comprising: a channel map calculator executed by the processor, wherein the processor defines for a geographic region a channel map that comprises a plurality of channel subdivisions each corresponding to a geographic local area within the geographic region; wherein the channel map calculator generates for each of the plurality of channel subdivisions an associated listing of shared spectrum band channel availability based on the exclusion zone.

Example 11 includes the system of Example 10, further comprising: a network interface; and a request processing function; wherein the request processing function processes requests for authorizing unlicensed operator use of the shared spectrum band received by the automatic frequency coordination system via the network interface based at least in part on the channel map.

Example 12 includes the system of Example 11, wherein the channel map is stored in a channel map database accessible by the request processing function.

Example 13 includes the system of any of Examples 10-11, wherein the associated listing of shared spectrum band channel availability comprises a list of restricted channels for one or more exclusion zones, wherein the list of restricted channels define segments of the shared spectrum band prohibited from use by unlicensed operators.

Example 14 includes the system of Example 13, wherein the list of restricted channels comprise one or more channels licensed for use by an incumbent operator associated with the incumbent receiver antenna, and one or more channels having a spectrum that overlaps with the channels licensed for use by the incumbent operator with the incumbent receiver antenna.

Example 15 includes a method for authorizing unlicensed utilization of a shared spectrum band comprising channels licensed to incumbent operators, the method comprising: constructing an exclusion zone for an incumbent receiver antenna operating on a licensed channel of the shared spectrum band by: calculating a set of exclusion zone radiuses along a plurality of radials of a radial grid based on applying a moving average filter to interference power values calculated for a plurality of locations along a length of each of the plurality of radials; and applying an averaging filter to the set of exclusion zone radiuses to define an exclusion zone between the exclusion zone radiuses and the incumbent receiver antenna.

Example 16 includes the method of Example 15, further comprising: calculating the interference power values by calculating an interference power as received at the incumbent receiver antenna for each of a plurality of candidate unlicensed operator locations along a length of each of the plurality of radials.

Example 17 includes the method of any of Examples 15-16, the method further comprising: defining on each of the plurality of radials a respective minimum exclusion zone (MEZ) radius; and calculating the set of exclusion zone radiuses by: calculating a respective exclusion zone radius for each of the plurality of radials by applying the moving average filter to the interference power calculated for each of a plurality of candidate unlicensed operator locations along the length of each of the plurality of radials; and determining a steady state distance based on when an output of the moving average filter reaches a steady state value at a distance from the incumbent receiver antenna greater than the respective MEZ radius for each of the plurality of radials.

Example 18 includes the method of any of Examples 15-17, wherein the interference power values calculated for the plurality of locations along the length of each of the plurality of radials are each computed at each location as a function of effective transmitted equivalent isotropic radiated power, receiver gain of the incumbent receiver antenna, and a path loss.

Example 19 includes the method of Example 18, further comprising: execute an algorithm to calculate the path loss utilizing an Irregular Terrain Model.

Example 20 includes the method of any of examples 18-19, further comprising: defining for a geographic region a channel map that comprises a plurality of channel subdivisions each corresponding to a geographic local area within the geographic region; and generating for each of the plurality of channel subdivisions an associated listing of shared spectrum band channel availability based on the exclusion zone.

Example 21 includes the method of Example 20, wherein the associated listing of shared spectrum band channel availability comprises a list of restricted channels for one or more exclusion zones, wherein the list of restricted channels define segments of the shared spectrum band prohibited from use by unlicensed operators.

Example 22 includes the method of Example 21, wherein the list of restricted channels comprise one or more channels licensed for use by an incumbent operator associated with the incumbent receiver antenna, and one or more channels having a spectrum that overlaps with the channels licensed for use by the incumbent operator with the incumbent receiver antenna.

In various alternative embodiments, system and/or device elements, method steps, or example implementations described throughout this disclosure (such as any of the AFC system, exclusion zone calculator, channel map calculator, network, channel map database, request processing function, exclusion zone database, or any controllers, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, DAS and network related terms such as "calculator", "processor", "network interface" "network", "memory", "database", "registry", "terrain map", refer to the names of elements that would be immediately recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. An automatic frequency coordination (AFC) system for authorizing unlicensed operator utilization of a shared spectrum band comprising channels licensed to incumbent operators, the system comprising:
a processor coupled to a memory; and
an exclusion zone calculator executed by the processor, the exclusion zone calculator configured to construct an exclusion zone for an incumbent receiver antenna operating on a licensed channel of the shared spectrum band, wherein the exclusion zone calculator is configured to construct the exclusion zone by:
calculating a set of exclusion zone radiuses along a plurality of radials of a radial grid based on applying a moving average filter to interference power values calculated for a plurality of locations along a length of each of the plurality of radials; and
applying an averaging filter to the set of exclusion zone radiuses to define the exclusion zone between the exclusion zone radiuses and the incumbent receiver antenna.

2. The system of claim 1, wherein the plurality of radials extend from the incumbent receiving antenna, wherein the plurality of radials include a main lobe radial aligned to an azimuth of a boresight of the incumbent receiver antenna, and a plurality of side radials distributed across an angle, A, on either side of the main lobe radial.

3. The system of claim 1, wherein the exclusion zone calculator is configured to calculate the interference power values by calculating an interference power as received at the incumbent receiver antenna for each of a plurality of candidate unlicensed operator locations along a length of each of the plurality of radials.

4. The system of claim 1, wherein the exclusion zone calculator is configured to define on each of the plurality of radials a respective minimum exclusion zone (MEZ) radius; and
calculate the set of exclusion zone radiuses by:
calculating a respective exclusion zone radius for each of the plurality of radials by applying the moving average filter to the interference power values calculated for each of a plurality of candidate unlicensed operator locations along the length of each of the plurality of radials; and
determining a steady state distance based on when an output of the moving average filter reaches a steady state value at a distance from the incumbent receiver antenna greater than the respective MEZ radius for each of the plurality of radials.

5. The system of claim 1, further comprising:
a network interface; and
a request processing function;
wherein the request processing function processes requests for authorizing unlicensed operator use of the shared spectrum band received by the automatic frequency coordination system via the network interface based at least in part on the exclusion zone.

6. The system of claim 5, wherein the exclusion zone is stored in an exclusion zone database accessible to the request processing function.

7. The system of claim 1, wherein the interference power values calculated for the plurality of locations along the length of each of the plurality of radials are each computed at each location as a function of effective transmitted equivalent isotropic radiated power, receiver gain of the incumbent receiver antenna, and a path loss.

8. The system of claim 7, wherein the exclusion zone calculator is configured to execute an algorithm to calculate the path loss utilizing an Irregular Terrain Model.

9. The system of claim 8, further comprising a terrain map that includes a digital topographic representation of geographic surface features for a geographic region comprising the incumbent receiver antenna;
wherein the exclusion zone calculator utilizes the terrain map to calculate the path loss utilizing the Irregular Terrain Model.

10. The system of claim 1, further comprising:
a channel map calculator executed by the processor, wherein the processor defines for a geographic region a channel map that comprises a plurality of channel subdivisions each corresponding to a geographic local area within the geographic region;
wherein the channel map calculator generates for each of the plurality of channel subdivisions an associated listing of shared spectrum band channel availability based on the exclusion zone.

11. The system of claim 10, further comprising:
a network interface; and
a request processing function;
wherein the request processing function processes requests for authorizing unlicensed operator use of the shared spectrum band received by the automatic frequency coordination system via the network interface based at least in part on the channel map.

12. The system of claim 11, wherein the channel map is stored in a channel map database accessible by the request processing function.

13. The system of claim 10, wherein the associated listing of shared spectrum band channel availability comprises a list of restricted channels for one or more exclusion zones,
wherein the list of restricted channels define segments of the shared spectrum band prohibited from use by unlicensed operators.

14. The system of claim 13, wherein the list of restricted channels comprise one or more channels licensed for use by an incumbent operator associated with the incumbent receiver antenna, and one or more channels having a spectrum that overlaps with the channels licensed for use by the incumbent operator with the incumbent receiver antenna.

15. A method for authorizing unlicensed utilization of a shared spectrum band comprising channels licensed to incumbent operators, the method comprising:
constructing an exclusion zone for an incumbent receiver antenna operating on a licensed channel of the shared spectrum band by:
calculating a set of exclusion zone radiuses along a plurality of radials of a radial grid based on applying a moving average filter to interference power values calculated for a plurality of locations along a length of each of the plurality of radials; and applying an averaging filter to the set of exclusion zone radiuses to define an exclusion zone between the exclusion zone radiuses and the incumbent receiver antenna.

16. The method of claim 15, further comprising:
calculating the interference power values by calculating an interference power as received at the incumbent receiver antenna for each of a plurality of candidate unlicensed operator locations along a length of each of the plurality of radials.

17. The method of claim 15, the method further comprising:
defining on each of the plurality of radials a respective minimum exclusion zone (MEZ) radius; and
calculating the set of exclusion zone radiuses by:
calculating a respective exclusion zone radius for each of the plurality of radials by applying the moving average filter to the interference power values calculated for each of a plurality of candidate unlicensed operator locations along the length of each of the plurality of radials; and
determining a steady state distance based on when an output of the moving average filter reaches a steady state value at a distance from the incumbent receiver antenna greater than the respective MEZ radius for each of the plurality of radials.

18. The method of claim 15, wherein the interference power values calculated for the plurality of locations along the length of each of the plurality of radials are each computed at each location as a function of effective transmitted equivalent isotropic radiated power, receiver gain of the incumbent receiver antenna, and a path loss.

19. The method of claim 18, further comprising:
executing an algorithm to calculate the path loss utilizing an Irregular Terrain Model.

20. The method of claim 18, further comprising:
defining for a geographic region a channel map that comprises a plurality of channel subdivisions each corresponding to a geographic local area within the geographic region; and
generating for each of the plurality of channel subdivisions an associated listing of shared spectrum band channel availability based on the exclusion zone.

21. The method of claim 20, wherein the associated listing of shared spectrum band channel availability comprises a list of restricted channels for one or more exclusion zones,
wherein the list of restricted channels define segments of the shared spectrum band prohibited from use by unlicensed operators.

22. The method of claim 21, wherein the list of restricted channels comprise one or more channels licensed for use by an incumbent operator associated with the incumbent receiver antenna, and one or more channels having a spectrum that overlaps with the channels licensed for use by the incumbent operator with the incumbent receiver antenna.

* * * * *